(12) United States Patent
Sung et al.

(10) Patent No.: US 9,589,095 B2
(45) Date of Patent: *Mar. 7, 2017

(54) METHOD OF CONVERTING BETWEEN NON-VOLATILE MEMORY TECHNOLOGIES AND SYSTEM FOR IMPLEMENTING THE METHOD

(71) Applicant: TAIWAN SEMICONDUCTOR MANUFACTURING COMPANY, LTD., Hsinchu (TW)

(72) Inventors: Hung-Cheng Sung, Kaohsiung (TW); Yue-Der Chih, Hsinchu (TW); Chia-Hsing Chen, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,039

(22) Filed: Oct. 8, 2015

(65) Prior Publication Data
US 2016/0034629 A1 Feb. 4, 2016

Related U.S. Application Data

(60) Continuation of application No. 14/567,456, filed on Dec. 11, 2014, now Pat. No. 9,171,120, which is a (Continued)

(51) Int. Cl.
*G06F 17/50* (2006.01)
*H01L 29/788* (2006.01)
(Continued)

(52) U.S. Cl.
CPC ...... *G06F 17/5072* (2013.01); *G06F 17/5068* (2013.01); *G06F 17/5077* (2013.01);
(Continued)

(58) Field of Classification Search
CPC ............ G06F 17/5072; G06F 17/5077; G06F 17/5068; G06F 2217/06; G06F 2217/78; H01L 27/0207; H01L 29/66825; H01L 27/11573; H01L 29/7881; H01L 29/792; H01L 27/11531

See application file for complete search history.

(56) References Cited

U.S. PATENT DOCUMENTS 3,683,335 A 8/1972 Cricchi et al.
5,313,427 A * 5/1994 Schreck ................ G11C 16/16
257/315

(Continued)

*Primary Examiner* — Naum B Levin
(74) *Attorney, Agent, or Firm* — Hauptman Ham, LLP (57) ABSTRACT

A method of designing a charge trapping memory array includes designing a memory array layout. The memory array layout includes a first type of transistors; electrical connections between memory cells of the memory array layout; a first input/output (I/O) interface; and a charge pump. The method further includes modifying the memory array layout, using a processor, to replace the first type of transistors with a second type of transistors different than the first type of transistors. The method further includes modifying the memory array layout, using the processor, to modify the charge pump based on an operating voltage of the second type of transistors.

20 Claims, 5 Drawing Sheets

Related U.S. Application Data division of application No. 13/794,024, filed on Mar. 11, 2013, now Pat. No. 8,930,866.

(51) Int. Cl.
*H01L 29/792* (2006.01)
*H01L 29/66* (2006.01)
*H01L 27/02* (2006.01)
*H01L 27/115* (2006.01)

(52) U.S. Cl.
CPC .... *H01L 27/0207* (2013.01); *H01L 27/11573* (2013.01); *H01L 29/66825* (2013.01); *H01L 29/7881* (2013.01); *H01L 29/792* (2013.01); *G06F 2217/06* (2013.01); *G06F 2217/78* (2013.01); *H01L 27/11531* (2013.01)

(56) References Cited

U.S. PATENT DOCUMENTS

| | | | |
|---|---|---|---|
| 5,589,413 A | 12/1996 | Sung et al. | |
| 5,734,607 A | 3/1998 | Sung et al. | |
| 5,982,661 A * | 11/1999 | Kawamata | G11C 16/26 365/185.01 |
| 6,555,427 B1 | 4/2003 | Shimizu et al. | |
| 6,808,985 B1 | 10/2004 | Lee et al. | |
| 6,943,404 B2 * | 9/2005 | Huang | H01L 21/28282 257/321 |
| 7,087,489 B2 | 8/2006 | Lee | |
| 7,091,755 B1 | 8/2006 | Zhou et al. | |
| 7,129,744 B2 * | 10/2006 | Madurawe | H03K 19/17704 326/38 |
| 7,161,207 B2 | 1/2007 | Hamaguchi et al. | |
| 7,214,983 B2 | 5/2007 | Han et al. | |
| 7,274,068 B2 * | 9/2007 | Forbes | G11C 16/10 257/314 |
| 7,342,828 B2 * | 3/2008 | Ishii | G11C 16/344 257/E21.691 |
| 7,393,699 B2 * | 7/2008 | Tran | B82Y 10/00 438/1 |
| 7,471,570 B2 | 12/2008 | Morton et al. | |
| 7,539,963 B2 | 5/2009 | Ema et al. | |
| 7,569,882 B2 | 8/2009 | Rosmeulen | |
| 7,577,010 B2 * | 8/2009 | Nagel | H01L 27/0688 365/182 |
| 7,679,133 B2 * | 3/2010 | Son | H01L 21/8221 257/328 |
| 7,800,156 B2 | 9/2010 | Roizin et al. | |
| 7,808,834 B1 | 10/2010 | Sutardja | |
| 7,945,825 B2 | 5/2011 | Cohen et al. | |
| 7,960,779 B2 | 6/2011 | Toba et al. | |
| 8,013,380 B2 | 9/2011 | Nakasaki et al. | |
| 8,120,960 B2 | 2/2012 | Varkony | |
| 8,189,397 B2 | 5/2012 | Eitan et al. | |
| 8,344,475 B2 | 1/2013 | Shaeffer et al. | |
| 8,436,410 B2 | 5/2013 | Kang et al. | |
| 8,456,918 B2 * | 6/2013 | Oh | G11C 16/10 365/185.02 |
| 8,598,005 B2 | 12/2013 | Chan et al. | |
| 8,610,220 B2 | 12/2013 | Chih et al. | |
| 8,674,422 B2 | 3/2014 | Horch | |
| 8,861,273 B2 | 10/2014 | Lue | |
| 8,934,304 B2 | 1/2015 | Cho et al. | |
| 9,171,120 B2 * | 10/2015 | Sung | G06F 17/5068 |
| 2002/0028541 A1 * | 3/2002 | Lee | G11C 16/3427 438/149 |
| 2006/0261401 A1 | 11/2006 | Bhattacharyya | |
| 2006/0261418 A1 | 11/2006 | Eitan et al. | |
| 2009/0257280 A1 * | 10/2009 | Oh | G11C 16/10 365/185.19 |
| 2009/0310405 A1 | 12/2009 | Lee et al. | |
| 2010/0117141 A1 * | 5/2010 | Shin | G11O 5/02 257/326 |
| 2011/0060875 A1 * | 3/2011 | Haukness | G11C 16/10 711/103 |
| 2011/0298037 A1 | 12/2011 | Choe et al. | |
| 2011/0299317 A1 | 12/2011 | Shaeffer et al. | |
| 2013/0119452 A1 * | 5/2013 | Endoh | G11C 16/0425 257/316 |
| 2013/0119455 A1 | 5/2013 | Chen et al. | |
| 2014/0094009 A1 | 4/2014 | Chih et al. | |

\* cited by examiner

METHOD OF CONVERTING BETWEEN NON-VOLATILE MEMORY TECHNOLOGIES AND SYSTEM FOR IMPLEMENTING THE METHOD

PRIORITY CLAIM

The present application is a continuation of U.S. application Ser. No. 14/567,456, filed Dec. 11, 2014, U.S. Pat. No. 9,171,120, issued Oct. 27, 2015, which is a divisional of U.S. application Ser. No. 13/794,024, filed Mar. 11, 2013, now U.S. Pat. No. 8,930,866, issued Jan. 6, 2015, which are incorporated herein by reference in their entireties.

BACKGROUND

A non-volatile memory is a computer readable storage medium capable of maintaining stored data even when disconnected from a power source for an extended period of time. Floating gate memory is a type of non-volatile memory which uses high voltages, e.g., greater than 10V, to program and erase data stored in a memory cell. Charge trapping memory is a type of non-volatile memory which uses lower voltages, e.g., less than 8V, to program and erase data stored in a memory cell. Floating gate memory is capable of storing data for a longer period of time than charge trapping memory, due to the higher potential barrier for the floating gate memory.

A process for forming floating gate memory is different from a process for forming charge trapping memory. In some instances, a size of transistor structures in each type of non-volatile memory is different. Different charge storing materials are used in the floating gate memory than in the charge trapping memory. Doping concentrations and depth of wells and lightly doped drain (LDD) regions are different in the floating gate memory than in the charge trapping memory.

Due to these differences, the processes for forming floating gate memory and charge trapping memory are separately optimized. As a result, separate masks and layout designs are used during the process for forming each type of non-volatile memory.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

This disclosure relates to a method of designing and manufacturing a floating gate memory or a charge trapping memory and a system for implementing these methods. The following description of a floating gate memory transistor and a charge trapping memory transistor as well as a memory array provide a better understanding of the methods and the system to implement the methods.

Figure 1A:
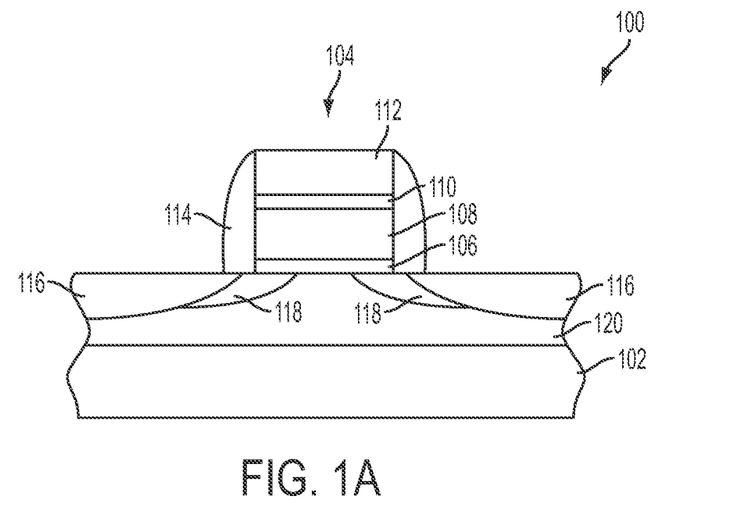
FIG. 1A is a cross sectional view of a transistor structure for a floating gate memory cell in accordance with one or more embodiments.

FIG. 1A is a cross sectional view of a transistor structure 100 for a floating gate memory cell in accordance with one or more embodiments. Transistor structure 100 includes a substrate 102 and a gate structure 104 on substrate 102. Gate structure 104 includes a gate dielectric layer 106 on substrate 102 and a floating gate material 108 on gate dielectric layer 106. Gate structure 104 further includes an oxide-nitride-oxide (ONO) layer 110 on floating gate material 108 and a contact gate 112 on ONO layer 110. Spacers 114 are formed over sidewalls of gate structure 104. Transistor structure 100 further includes source/drain regions 116 in substrate 102 on both sides of gate structure 104. Transistor structure 100 also includes lightly doped drain (LDD) regions 118 extending from source/drain regions 116 to a space under gate structure 104. Transistor structure 100 also includes a device well 120 formed in substrate 102, the device well surrounds source/drain regions 116 and LDD regions 118.

In some embodiments, substrate 102 comprises an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In some embodiments, the alloy semiconductor substrate has a gradient SiGe feature in which the Si and Ge composition change from one ratio at one location to another ratio at another location of the gradient SiGe feature. In some embodiments, the alloy SiGe is formed over a silicon substrate. In some embodiments, substrate 102 is a strained SiGe substrate. In some embodiments, the semiconductor substrate has a semiconductor on insulator structure, such as a silicon on insulator (SOI) structure. In some embodiments, the semiconductor substrate includes a doped epi layer or a buried layer. In some embodiments, the compound semiconductor substrate has a multilayer structure, or the substrate includes a multilayer compound semiconductor structure.

In some embodiments, gate dielectric layer 106 comprises silicon dioxide. In some embodiments, gate dielectric layer 106 comprises a high-k dielectric material. A high-k dielectric material has a dielectric constant (k) higher than the dielectric constant of silicon dioxide. In some embodiments, the high-k dielectric material has a k value greater than 3.9. In some embodiments, the high-k dielectric material has a k value greater than 8.0.

Floating gate material 108 is a conductive material. The conductive material enables a charge introduced at a point of the floating gate material 108 to distribute evenly through the floating gate material. In some embodiments, floating gate material 108 comprises polysilicon. In some embodiments, floating gate material 108 includes doped polysilicon, metal, metal alloy, polycide or other suitable conductive materials. During operation, a charge stored in floating gate material 108 is used to determine a value of a datum stored in transistor structure 100.

ONO layer 110 is a multilayer structure formed by a silicon nitride layer positioned between silicon oxide layers. In some embodiments, ONO layer 110 is replaced with a different dielectric material. In some embodiments, the ONO layer 110 is replaced by a combination of a silicon oxide layer and a layer of high-k dielectric material.

Contact gate 112 is a conductive material. Contact gate 112 is configured to electrically connect gate structure 104 to external circuitry. In some embodiments, contact gate 112 comprises polysilicon. In some embodiments, contact gate 112 includes doped polysilicon, metal, metal alloy, polycide or other suitable conductive materials. In some embodiments, contact gate 112 is a same material as floating gate material 108. In some embodiments, contact gate 112 is a different material from floating gate material 108.

Spacers 114 are configured to electrically insulate gate structure 104 from surrounding elements. In some embodiments, spacers 114 comprise silicon nitride. In some embodiments, spacers 114 comprise a dielectric material other than silicon nitride.

Source/drain regions 116 include portions of substrate 102 which have a dopant type opposite to a dopant type of device well 120. In some embodiments, source/drain regions 116 include p-type dopants such as boron, boron di-fluroide or other suitable dopants. In some embodiments, source/drain regions 116 include n-type dopants such as arsenic, phosphorous or other suitable dopants. In some embodiments, source/drain regions 116 are formed by ion implantation. In some embodiments, source/drain regions 116 are formed by an annealing process. In some embodiments, source/drain regions 116 are formed by removing a portion of substrate 102 and forming a material in the opening in the substrate. In some embodiments, source/drain regions 116 have a dopant concentration ranging from $1\times10^{15}$ atoms/cm$^2$, to $5\times10^{15}$ atoms/cm$^2$. If the dopant concentration is less than $1\times10^{15}$ atoms/cm$^2$, source/drain regions 116 do not provide sufficient conductivity to allow transistor structure 100 to efficiently pass a current, in some instances. If the dopant concentration exceeds $5\times10^{15}$ atoms/cm$^2$ source/drain regions 116 will cause gate structure 104 to become saturated, in some instances.

LDD regions 118 include portions of substrate 102 which have a dopant type the same as the dopant type of source/drain regions 116, but have a lower dopant concentration than the source/drain regions. LDD regions 118 extend further under gate structure 104 than source/drain regions 116. In some embodiments, LDD regions 118 include the same dopant as source/drain regions 116. In some embodiments, LDD regions 118 include a different dopant from source/drain regions 116. In some embodiments, LDD regions 118 are formed by ion implantation. In some embodiments, the ion implantation process includes angling the ion source with respect to a top surface of substrate 102. In some embodiments, LDD regions 118 are formed by an annealing process. In some embodiments, LDD regions 118 have a dopant concentration ranging from $5\times10^{14}$ atoms/cm$^2$, to $5\times10^{15}$ atoms/cm$^2$. If the dopant concentration is less than $5\times10^{14}$ atoms/cm$^2$ LDD regions 118 do not provide sufficient conductivity to allow transistor structure 100 to efficiently pass a current, in some instances. If the dopant concentration exceeds $5\times10^{15}$ atoms/cm$^2$, LDD regions 118 will cause gate structure 104 to become saturated, in some instances. In some embodiments, LDD regions 118 are omitted.

Device well 120 includes a doped region of substrate 102. Device well 120 aids in conducting a current between source/drain regions 116. In some embodiments, device well 120 is a multilayer well comprising stacked wells having alternating dopant types. In some embodiments, device well 120 is formed by epitaxially growing a doped layer over substrate 102.

Figure 1B:
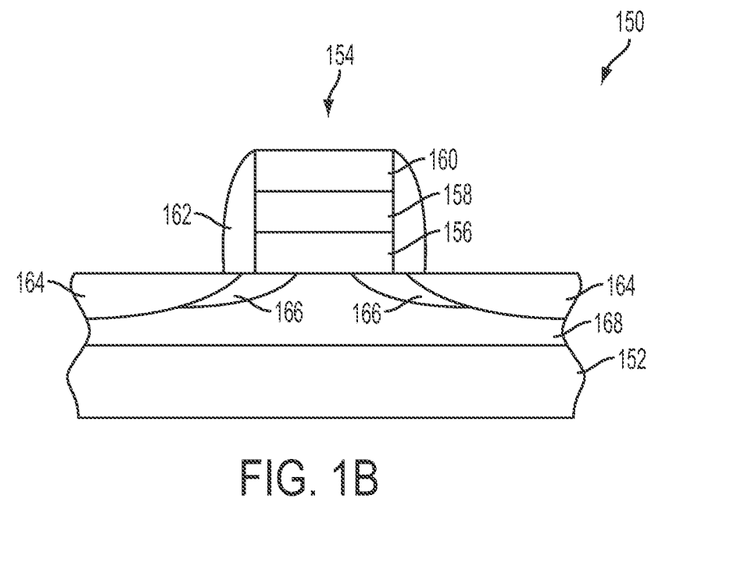
FIG. 1B is a cross sectional view of a transistor structure for a charge trapping memory cell in accordance with one or more embodiments.

FIG. 1B is a cross sectional view of a transistor structure 150 for a charge trapping memory cell in accordance with one or more embodiments. Transistor structure 150 includes a substrate 152 and a gate structure 154 on the substrate. Gate structure 154 includes a gate dielectric layer 156 on substrate 152. Gate structure 154 also includes a charge trapping material 158 on gate dielectric layer 156. Gate structure 154 further includes a contact gate 160 on charge trapping material 158. Spacers 162 are formed on sidewalls of gate structure 154. Transistor structure 150 further includes source/drain regions 164 in substrate 152 on both sides of gate structure 154. Transistor structure 150 also includes lightly doped drain (LDD) regions 166 extending from source/drain regions 164 to a space under gate structure 154. Transistor structure 150 also includes a device well 168 formed in substrate 152, the device well surrounds source/drain regions 164 and LDD regions 166.

In some embodiments, substrate 152, gate dielectric layer 156 spacers 162, source/drain regions 164 and contact gate 160 of transistor structure 150 are the same as substrate 102, gate dielectric layer 106, spacers 114, source/drain regions 116 and contact gate 112 of transistor structure 100, respectively.

Charge trapping material 158 is a dielectric material. The dielectric material of charge trapping material 158 does not easily distribute a charge introduced at one point of the charge trapping material across an entirety of the charge trapping material. In some embodiments, charge trapping material 158 comprises silicon nitride. In some embodiments, charge trapping material 158 comprises a high-k dielectric material or other suitable dielectric materials. In some embodiments, charge trapping material 158 comprises a combination of a silicon nitride layer and a layer of high-k dielectric material. During operation, a charge stored in charge trapping material 158 is used to determine a value of a datum stored in transistor structure 150. During operation, a lower operating voltage is used to store or remove a charge from charge trapping material 158 than floating gate material 108, in some embodiments.

LDD regions 166 perform a similar function as LDD regions 118. LDD regions 166 have a higher doping concentration than LDD regions 118. In some embodiments, a depth of LDD regions 118 within substrate 102 is greater than a depth of LDD regions 166 in substrate 152.

Device well 168 performs a similar function as device well 120. In some embodiments, device well 168 has a higher doping concentration than device well 120. In some embodiments, a depth of device well 120 within substrate 102 is greater than a depth of device well 168 in substrate 152.

Figure 2:
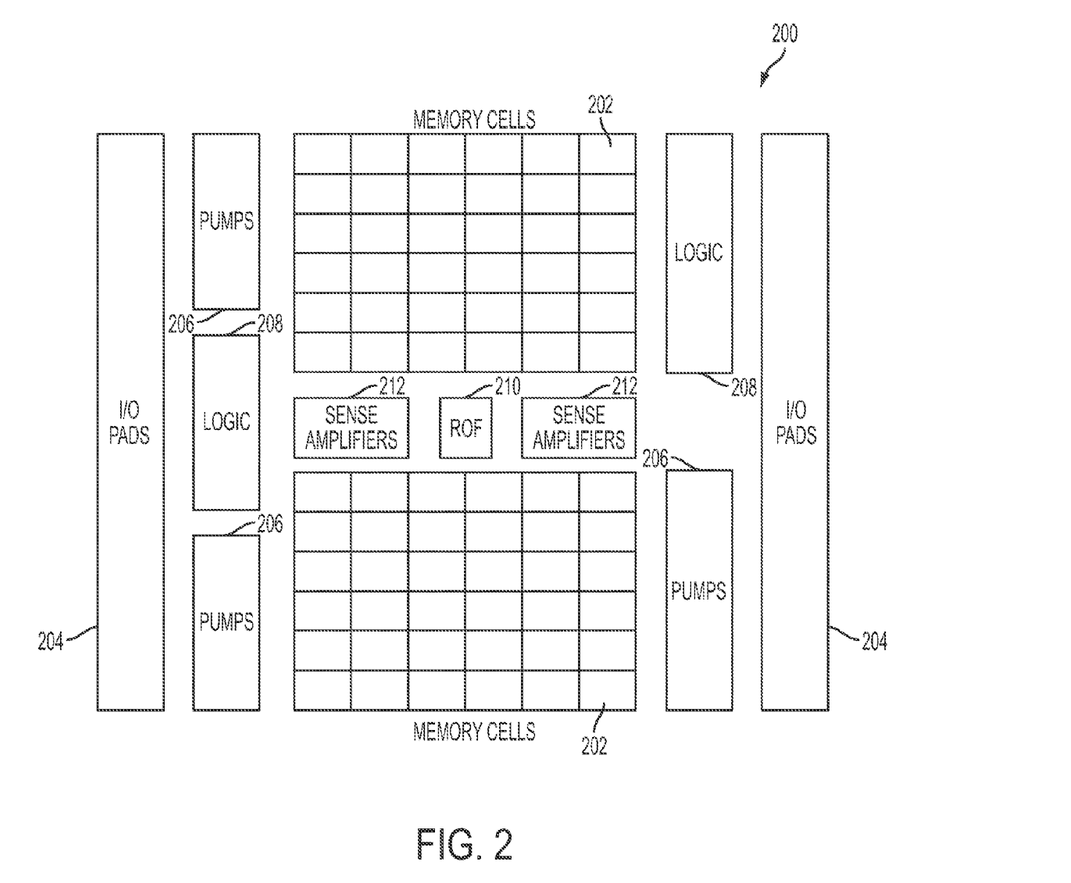
FIG. 2 is a schematic view of a non-volatile memory array in accordance with one or more embodiments.

FIG. 2 is a schematic view of a non-volatile memory block 200 in accordance with one or more embodiments. Non-volatile memory array 200 includes at least one array of memory cells array 202. Non-volatile memory block 200 further includes input/output (I/O) pads 204 configured to transfer information between memory cells 202 and external circuitry. Non-volatile memory block 200 further includes charge pumps 206 configured to adjust a voltage level between memory cells 202 and I/O pads 204. Non-volatile memory block 200 further includes logic circuits 208 configured to control memory cells 202 and a reference voltage generator 210 configured to supply a reference voltage for comparison with a voltage generated during operation of memory cells 202. Non-volatile memory block 200 further includes sense amplifiers 212 configured to amplify a difference between the reference voltage and the voltage generated during operation of memory cells 202.

An array of memory cells 202 comprises non-volatile memory cells configured to store data. In some embodiments, memory cells 202 comprise transistors similar to transistor structure 100. In some embodiments, memory cells 202 comprise transistors similar to transistor structure 150. Memory cells 202 are arranged in an array structure. Memory cells 202 include at least one memory transistor, e.g., transistor structure 100 or transistor structure 150, and at least one selector transistor configured to connect the at least one memory transistor to external circuitry.

I/O pads 204 include transistors configured to selectively connect memory cells 202 to external circuitry. In operation, I/O pads 204 transfer address and operation information to memory cells 202 and receives information read from the memory cells to be transferred to external circuitry.

Charge pumps 206 are configured to alter the voltage level between I/O pads 204 and memory cells 202. In some embodiments, memory cells 202 have a higher operating voltage than I/O pads 204 and charge pumps 206 increase the voltage received from the I/O pads to the higher operating voltage of the memory cells. In some embodiments, memory cells 202 have a higher operating voltage than I/O pads 204 and charge pumps 206 increase the voltage received from the I/O pads to the higher operating voltage of the memory cells. In some embodiments, memory cells 202 have a same operating voltage than I/O pads 204 and charge pumps 206 are omitted.

Logic circuit 208 is configured to receive information from I/O pads 204 and route commands to specific memory cells 202 based on received address information. Logic circuit 208 is also configured to output information read from memory cells 202 to the appropriate I/O pad 204.

Reference voltage generator 210 is configured to generate the reference voltage to be compared with a voltage generated during a read operation of memory cells 202. In some embodiments, reference voltage generator 210 is configured to generate a temperature independent reference voltage.

Sense amplifiers 212 are configured to compare the reference voltage generated by reference voltage generator 210 with the voltage generated during a read operation of memory cells 202. Based on the comparison with the reference voltage, sense amplifiers 212 determine whether the data stored in the memory cells is a high logical value or a low logical value.

Figure 3:
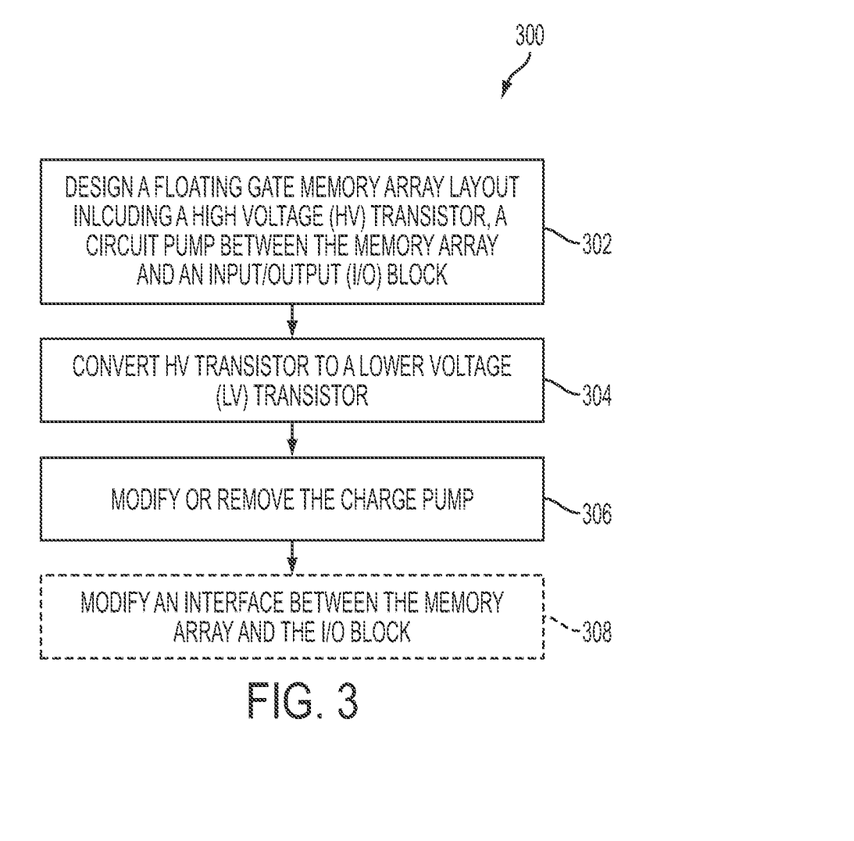
FIG. 3 is a flowchart for a method of converting a design for a floating gate memory array to a design for a charge trapping memory array in accordance with one or more embodiments.

FIG. 3 is a flowchart for a method 300 of converting a design for a floating gate memory array to a design for a charge trapping memory array in accordance with one or more embodiments. In step 302, a floating gate memory array layout is designed. The floating gate memory array layout includes memory cells having a high voltage (HV) transistor and a charge pump configured to increase a voltage level supplied to the memory cells from an input/output (I/O) block. In step 304, the HV transistor of the memory cells is converted to a lower voltage (LV) transistor. In some embodiments, a write/erase voltage of the HV transistors ranges from about 10 V to about 20 V. In some embodiments, a write/erase voltage of the LV transistors ranges from about 5 V to about 10 V. In step 306, the charge pump is modified or removed. In step 308, an I/O interface between the memory cells and the I/O block is modified.

In step 302, the floating gate memory block layout is designed. The floating gate memory block layout includes a location of the memory cells array, high voltage (HV) transistor switch, low voltage (LV) control circuit, a charge pump, and an I/O interface. In some embodiments, the floating gate memory array layout includes more than one charge pump. In some embodiments, transistors of the floating gate memory array have a structure matching transistor structure 100. The memory cells of the floating gate memory array have a higher operating voltage than the I/O block. The charge pump for the floating gate memory array steps up the operating voltage of the I/O block to provide the operating voltage for the memory cells.

The memory cells are electrically connected to the I/O block by the I/O interface. In some embodiments, the I/O interface includes I/O pins extending from an exterior row of the memory cells. A position of each I/O pin is selected to provide sufficient voltage to program data to the memory cells and erase data from the memory cells. During implementation, a processor is used to design the floating gate memory array layout, in some embodiments.

In step 304, the transistors of the memory cells are converted from HV transistors to LV transistors. In some embodiments, the size of the HV transistors and the LV transistors are the same. In some embodiments, the size of the HV transistors is different from the size of the LV transistors. The location of the memory cells is not changed by the conversion from HV transistors to LV transistors. During implementation, the processor is used to convert the HV transistors to LV transistors within the floating gate memory array layout, in some embodiments.

Memory cell address selection, as well as read, program and erase operations for the floating gate memory is the same as charge trapping memory. A current path for selecting, reading, programming or erasing a memory cell is the same regardless of whether the memory block includes the HV transistors or the LV transistors.

In step 306, the charge pump can be modified to smaller size or removed. In some embodiments, LV transistors switches of the memory block have a same operating voltage as the I/O block. If LV transistor switches have the same operating voltage as the I/O block, the charge pump is removed because adjusting the operating voltage for the memory cells is not necessary. In some embodiments, LV transistor switches have a different operating voltage than the I/O block. A difference between the operating voltage of the I/O block and LV transistor switches is less than a difference between the operating voltage of the I/O block and HV transistor switches. As a result, a size of the charge pump for the LV transistor switches is decreased with respect to a size of the charge pump for the HV transistor memory cells. During implementation, the processor is used to modify the charge pump within the floating gate memory array layout, in some embodiments.

In step 308, the I/O interface between the memory cells and the I/O block is modified. In some embodiments, the I/O interface between the memory cells and the I/O block is determined by the location of the I/O pins. The dashed outline for step 308 indicates that in some embodiments, the I/O interface between the memory cells and the I/O block is not modified. In some embodiments, the arrangement of the I/O interface is adjusted to account for the difference in operating voltage between HV transistor memory cells and LV transistor memory cells. In some embodiments, the arrangement of the I/O interface remains constant and step 308 is omitted. During implementation, the processor is used to modifying the interface between the memory array and the I/O block within the floating gate memory array layout, in some embodiments.

One of ordinary skill in the art will recognize that while method 300 is described as converting a floating gate memory array layout to a charge trapping memory array layout, a method of converting the charge trapping memory array layout to the floating gate memory array layout is within the scope of this disclosure. For example, during a method to convert the charge trapping memory array layout to the floating gate memory array layout, the LV transistors of the charge trapping memory array layout would be converted into HV transistors for the floating gate memory array layout. In addition, the charge pump would be either added or increased in size to step up the voltage to effectively operate the floating gate memory array layout.

Figure 4:
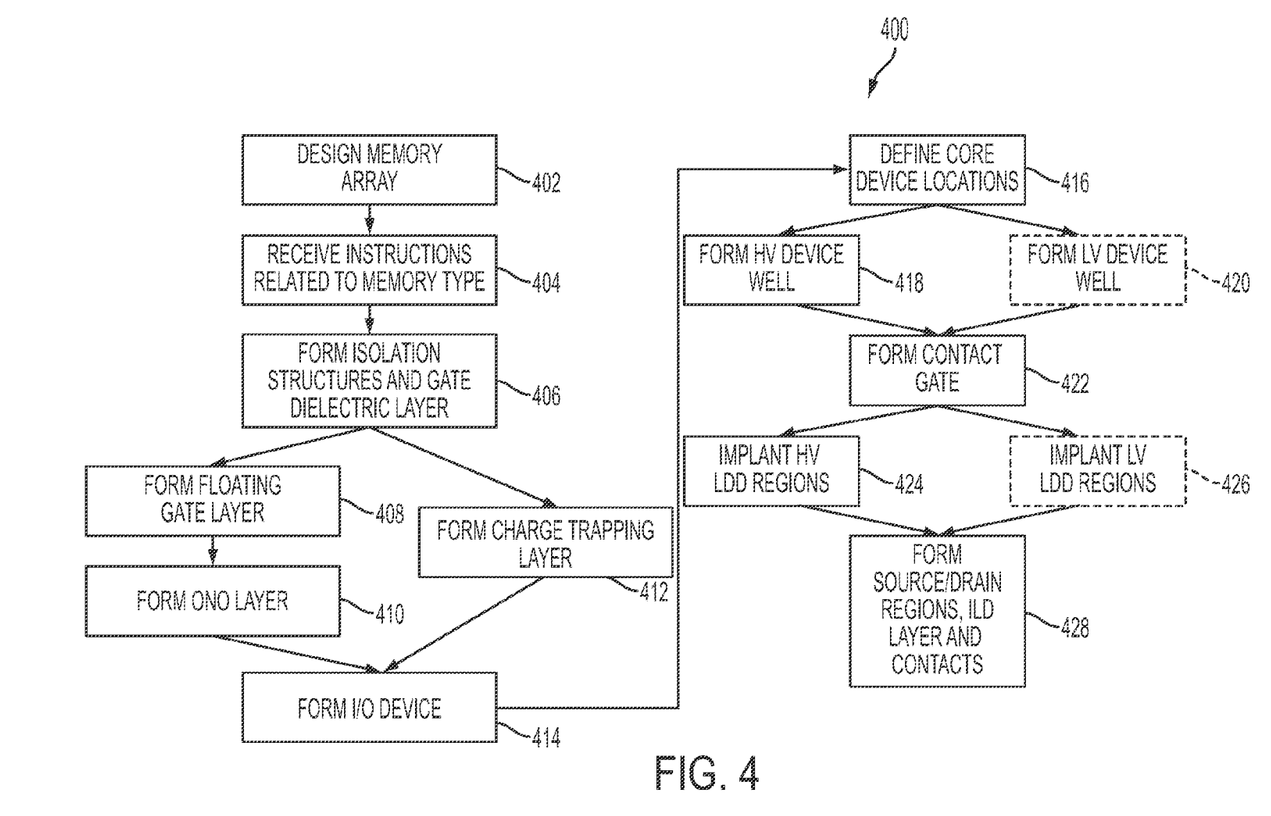
FIG. 4 is a flowchart for a method of producing a floating gate memory array or a charge trapping memory array in response to received instructions in accordance with one or more embodiments.

FIG. 4 is a flowchart for a method 400 of producing a floating gate memory array or a charge trapping memory array in response to received instructions in accordance with one or more embodiments. In step 402, a memory array is designed. Designing the memory array includes developing a circuit diagram and a layout of the memory array. In some embodiments, designing the memory array also includes forming at least one mask for a lithography process used during formation of memory cells of the memory cell array. The memory array design includes a location of each memory cell in the memory array as well as the electrical connections between memory cells. The memory array design includes a memory core, where memory cells are located, and an input/output (I/O) area, where at least one I/O device is located as well as an I/O interface between the core area and the I/O area. In some embodiments, the memory array design also includes charge pumps. The design of the memory array is the same for each of floating gate memory or charge trapping memory formed during production of the memory array. During implementation, the processor is used to design the memory array, in some embodiments.

In step 404, instructions related to a selected memory type are received. In some embodiments, the instructions are electronic files created using a processor. In some embodiments, the instructions are inputted using a man-machine interface. The memory type is either a floating gate memory or a charge trapping memory. In some embodiments, the instructions are provided by a customer. In some embodiments, the instructions are provided by a circuit designer. The floating gate memory requires higher voltages to program and erase data in the memory array than the charge trapping memory; however, the floating gate memory is capable of maintaining a stored value in the memory array for a longer period of time than the charge trapping memory. In some instances, producing the floating gate memory is more costly than producing the charge trapping memory, so floating gate memory is selected if a final product significantly benefits from the memory array having high reliability and longer term storage capability. During implementation, the processor is used to analyze and store the instructions, in some embodiments.

In step 406, isolation structures and gate dielectric layers are formed. The isolation structures include non-conductive features formed between memory cells to electrically insulate one memory cell from another. In some embodiments, the isolation structures include shallow trench isolation (STI) structures, local oxidation of silicon (LOCOS), or other suitable isolation structures. The gate dielectric layers are the dielectric layer, e.g., gate dielectric layer 106 or gate dielectric layer 156, disposed over a substrate to separate the substrate from a charge storing material. The gate dielectric layer includes a same material and a same thickness for either floating gate memory or charge trapping memory, During implementation, the processor is used to generate instructions for transmitting to manufacturing machines for forming the isolation structures and gate dielectric layers, in some embodiments.

A next step after step 406 depends on the received instructions related to the memory type. If the received instructions selected a floating gate memory, method 400 continues with steps 408 and 410. If the received instructions selected a charge trapping memory, method 400 continues with step 412. During implementation, the processor is used to analyze the instructions and determine which steps to follow after step 406, in some embodiments.

In step 408, a floating gate layer is formed. The floating gate layer, e.g. floating gate material 108 (FIG. 1A), is formed over the gate dielectric layer. The floating gate layer is configured to accumulate a charge indicating a datum stored in the memory cell. In some embodiments, the floating gate layer comprises polysilicon. In some embodiments, the floating gate layer comprises doped polysilicon, metal, metal alloy, polycide or other suitable conductive materials. During implementation, the processor is used to generate instructions for transmitting to manufacturing machines for forming the floating gate layer, in some embodiments.

In step 410, an ONO layer is formed. The ONO layer, e.g., ONO layer 110 (FIG. 1A), is formed over the floating gate layer. The ONO layer reduces a voltage necessary to program or erase data in the floating gate memory in comparison with floating gate memories which lack an ONO layer. The ONO layer also helps to increase durability of the floating gate memory during repeated programming and erasing operations, thereby increasing longevity of the floating gate memory. During implementation, the processor is used to generate instructions for transmitting to manufacturing machines for forming the ONO layer, in some embodiments.

In step 412, a charge trapping layer is formed. The charge trapping layer, e.g., charge trapping material 158 (FIG. 1B), is formed over the gate dielectric. The charge trapping layer is configured to accumulate a charge indicating a datum stored in the memory cell. In some embodiments, the charge trapping layer comprises silicon nitride. In some embodiments, the charge trapping layer comprises a high-k dielectric material or other suitable dielectric materials. During implementation, the processor is used to generate instructions for transmitting to manufacturing machines for forming the charge trapping layer, in some embodiments.

Following either step 410 or 412, method 400 continues with step 414. In step 414, an input/output (I/O) device is formed. Forming the I/O device includes forming an I/O device well to aid in passing current across transistors in the I/O device. Forming the I/O devices includes forming I/O LDD regions. In some embodiments, the I/O device is formed using a complementary metal-oxide-semiconductor (CMOS) process. In some embodiments, the I/O device surrounds an array of memory cells. In some embodiments, the I/O device, e.g., I/O pads 204 (FIG. 2), is formed along one or more sides of the memory cells, e.g., memory cells 202. The I/O device connects the memory cells to external circuitry. In some embodiments, the I/O device has an operating voltage different from the memory cells. In some embodiments, the I/O device has the same operating voltage as the memory cells. During implementation, the processor is used to generate instructions for transmitting to manufacturing machines for forming the I/O device, in some embodiments.

In step 416, locations of devices in the core area are defined. The core area devices are for the control logic and decoding circuit to selectively connect the memory transistors to the I/O device. The location of the core area devices is the same for either the floating gate memory or the charge trapping memory. In some embodiments, the locations of the core devices are formed by performing lithography and etching processes to form gate stacks. By using the same locations regardless of the memory type, fewer sets of masks are used to form the floating gate memory or the charge trapping memory. Using fewer sets of masks reduces production costs and increases production efficiency by eliminating a step of replacing as many masks when transitioning from one type of memory production to the other type of memory production. During implementation, the processor is used to generate instructions for transmitting to manufacturing machines for defining the core area devices based on the designed memory array, in some embodiments.

A next step after step 416 depends on the received instructions related to the selected memory type. If the received instructions select the floating gate memory, method 400 continues with step 418. If the received instructions select the charge trapping memory, method 400 continues with step 420. During implementation, the processor is used to analyze the instructions and determine which steps to follow after step 416, in some embodiments.

In step 418, a high voltage (HV) device well is formed. The HV device well is formed separately from the I/O device well because the HV device well has a lower doping concentration and has a greater well depth than the I/O device well. In some embodiments, the HV device well is formed by ion implantation. In some embodiments, the HV device well is formed using an anneal process. In some embodiments, the HV device well is formed by epitaxially growing a layer over the substrate. During implementation, the processor is used to generate instructions for transmitting to manufacturing machines for forming the HV device well, in some embodiments.

In step 420, a lower voltage (LV) device well is formed. In some embodiments where the I/O device has the same operating voltage as the charge trapping transistor, the LV device well is formed at the same time as the I/O device well in step 414, and step 420 is omitted. In some embodiments where the I/O device has the same operating voltage as the charge trapping transistor, the LV device well is formed separately from the I/O device well. In some embodiments, where the I/O device has a different operating voltage from the charge trapping transistor, the LV device well is formed separately from the I/O device well. In some embodiments, the LV device well is formed by ion implantation. In some embodiments, the LV device well is formed using an anneal process. In some embodiments, the LV device well is formed by epitaxially growing a layer over the substrate. During implementation, the processor is used to generate instructions for transmitting to manufacturing machines for forming the MV device well, in some embodiments.

Following either step 418 or 420, method 400 continues with step 422. In step 422, a contact gate is formed. The contact gate, e.g., contact gate 112 or contact gate 160 (FIG. 1A or 1B), electrically connects a gate stack of the memory transistor to external circuitry. The contact gate is the same for either floating gate memory or charge trapping memory. In some embodiments, the contact gate is formed by depositing a blanket layer of conductive material, e.g., polysilicon, and then removing the conductive material outside the gate stack by at least one of etching or chemical mechanical polishing (CMP). During implementation, the processor is used to generate instructions for transmitting to manufacturing machines for forming the contact gate, in some embodiments.

A next step after step 422 depends on the received instructions related to the selected memory type. If the received instructions select the floating gate memory, method 400 continues with step 424. If the received instructions select the charge trapping memory, method 400 continues with step 426. During implementation, the processor is used to analyze the instructions and determine which steps to follow after step 422, in some embodiments.

In step 424, a HV LDD region is implanted. The HV LDD region, e.g., LDD regions 118 (FIG. 1A), aids the floating gate transistor in conducting electricity by increasing a doping concentration in an area of the substrate beneath the floating gate transistor. The HV LDD region is formed separately from the I/O LDD region because the HV LDD region has a lower doping concentration and has a greater depth than the I/O LDD region. In some embodiments, the HV LDD region is formed by ion implantation or annealing. In some embodiments, the ion implantation process is angled so that the HV LDD region extends beneath the gate stack of the floating gate memory. During implementation, the processor is used to generate instructions for transmitting to manufacturing machines for forming HV LDD region, in some embodiments.

In step 426, a LV LDD region is implanted. The LV LDD region, e.g., LDD regions 166 (FIG. 1B), aids the charge trapping transistor in conducting electricity by increasing a doping concentration in an area of the substrate beneath the charge trapping transistor. In some embodiments where the I/O device has the same operating voltage as the charge trapping transistor, the LV LDD region is formed at the same time as the I/O LDD region in step 414, and step 426 is omitted. In some embodiments where the I/O device has the same operating voltage as the charge trapping transistor, the LV LDD region is formed separately from the I/O LDD region. In some embodiments where the I/O device has a different operating voltage from the charge trapping transistor, the LV LDD region is formed separately from the I/O LDD region. During implementation, the processor is used to generate instructions for transmitting to manufacturing machines for forming the LV LDD region, in some embodiments.

In some embodiments, the source/drain regions are formed by at least one of ion implantation or annealing processes. In some embodiments, the source/drain regions are formed by etching an opening into the substrate and forming a material into the opening. By having the same source/drain regions, any ion implantation, annealing, etching, deposition, or growing processes used to form the source/drain regions remain constant regardless of whether floating gate memory or charge trapping memory is produced. Using the same processes reduces process complexity of the production of the memory array because adjustments to manufacturing machines are reduced or eliminated.

Following either step 424 or step 426, method 400 continues with step 428. In step 428, source/drain regions, inter-layer dielectric (ILD) layers and contacts are formed. The source/drain regions, ILD layers and contacts are the same for either floating gate memory or charge trapping memory. During implementation, the processor is used to generate instructions for transmitting to manufacturing machines for forming the source/drain regions, ILD layer and contacts, in some embodiments.

In some embodiments, the ILD layer comprises forming a dielectric layer over the memory cells. In some embodiments, the contacts are formed by etching vias in the ILD layer to electrically connect to the source/drain regions and the gate stack of the memory cells. In some embodiments, forming the contacts includes forming a silicide or salicide layer over the source/drain regions and the gate stack. Having the same ILD layer and contacts for both memory types also reduces process complexity by reducing or eliminating an amount of adjustments to manufacturing machines.

One of ordinary skill in the art will recognize, in some embodiments, the steps of method 400 are performed in a different order. One of ordinary skill in the art will further recognize, in some embodiments, the steps of method 400 are removed or additional steps are added to method 400 without departing from the spirit of this disclosure.

Figure 5:
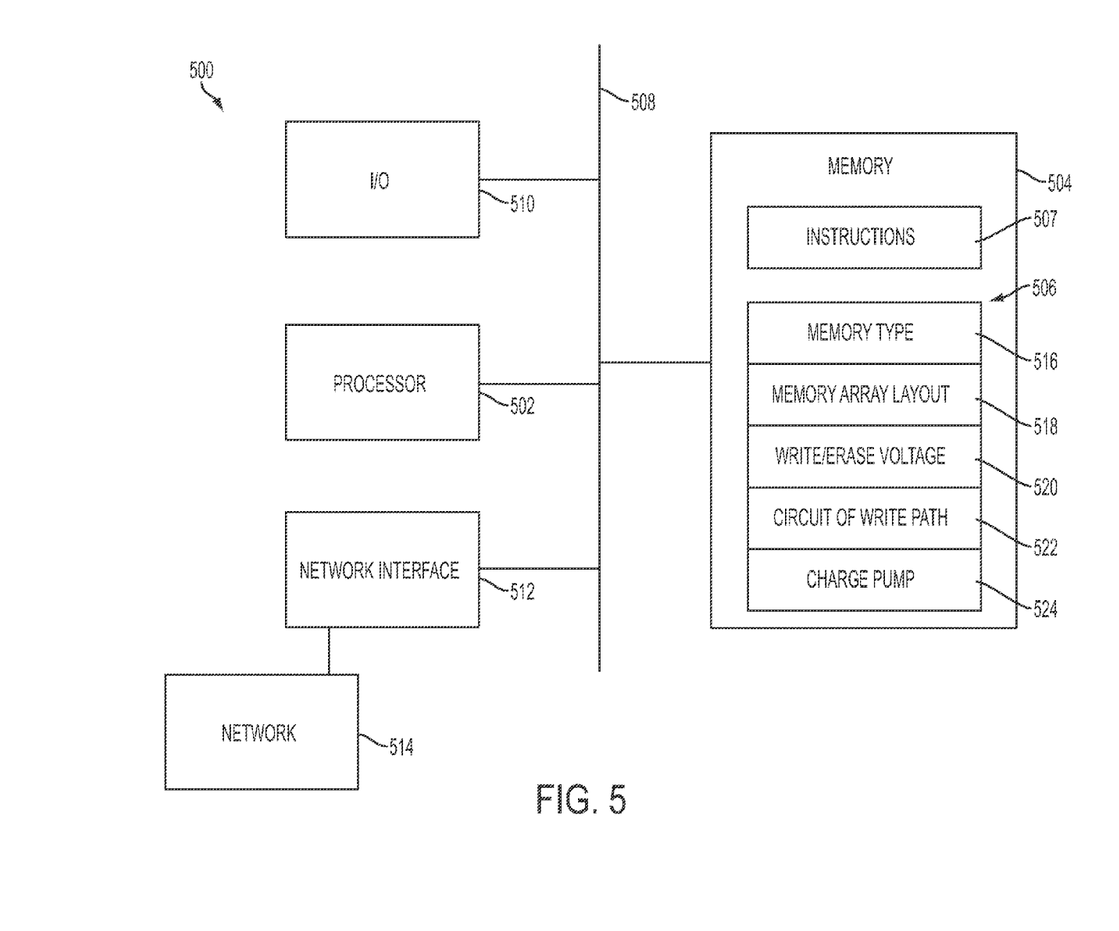
FIG. 5 is a schematic view of a system for altering a design for a memory array or executing a production process for either a floating gate memory array or a charge trapping memory array in accordance with one or more embodiments.

FIG. 5 is a schematic view of a system 500 for altering a design for a memory array or executing a production process for either a floating gate memory array or a charge trapping memory array in accordance with one or more embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with manufacturing machines for producing the memory array. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described in method 300 or method 400.

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform method 300 or method 400. In some embodiments, the storage medium 504 also stores information needed for performing a method 300 or 400 as well as information generated during performing the method 300 or 400, such as a memory type parameter 516, a memory array layout parameter 518, an I/O voltage parameter 520, an I/O interface arrangement parameter 522, a charge pump parameter 524 and/or a set of executable instructions to perform the operation of method 300 or 400.

In some embodiments, the storage medium 504 stores instructions 507 for interfacing with manufacturing machines. The instructions 507 enable processor 502 to generate manufacturing instructions readable by the manufacturing machines to effectively implement method 400 during a manufacturing process.

System 500 includes I/O interface 510. I/O interface 510 is coupled to external circuitry. In some embodiments, I/O interface 510 includes a keyboard, keypad, mouse, trackball, trackpad, and/or cursor direction keys for communicating information and commands to processor 502.

System 500 also includes network interface 512 coupled to the processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, method 300 or 400 is implemented in two or more systems 500, and information such as memory type, memory array layout, I/O voltage, I/O pin location and charge pump are exchanged between different systems 500 via network 514.

System 500 is configured to receive information related to a type of process through I/O interface 510. The information is transferred to processor 502 via bus 508 to determine a memory type for the production of process. The memory type is then stored in computer readable medium 504 as memory type parameter 516. System 500 is configured to receive information related to memory array layout through I/O interface 510. The information is stored in computer readable medium 504 as memory array layout parameter 518. System 500 is configured to receive information related to Write voltage through I/O interface 510. The information is stored in computer readable medium 504 as Write voltage parameter 520. System 500 is configured to receive information related to I/O interface arrangement through I/O interface 510. The information is stored in computer readable medium 504 as I/O interface arrangement parameter 522. System 500 is configured to receive information related to charge pump through I/O interface 510. The information is stored in computer readable medium 504 as charge pump parameter 524. In some embodiments, the information related to at least one of Write voltage, I/O interface arrangement and charge pump are extracted from memory array layout parameter 518 by processor 502 and stored as the appropriate parameter in computer code 506.

During operation, processor 502 executes a set of instructions to determine a charge storing material based on memory type parameter 516. For method 300, if memory type parameter 516 indicates a floating gate type memory, processor 502 alters memory array layout parameter 518 accordingly. In some embodiments, processor 502 extracts write/erase voltage of the floating gate memory transistors from memory array layout parameter 518. For method 300, if memory type parameter 516 indicates a charge trapping type memory, processor 502 alters memory array layout parameter 518 to have charge trapping memory transistors. In some embodiments, processor 502 extracts an operating voltage of the charge trapping memory transistors from memory array layout parameter 518. For method 400, if memory type parameter 516 indicates a floating gate type memory, system 500 provides instructions to manufacturing machines, through either I/O interface 510 or network interface 512, to form the charge storing material comprising a floating gate material. For method 400, if memory type parameter 516 indicates a charge trapping type memory, system 500 provides instructions, through either I/O interface 510 or network interface 512, to form the charge storing material comprising a charge trapping material.

During operation, processor 502 executes a set of instructions to determine a doping concentration and depth of the LDD region and the device well based on memory type parameter 516 and I/O voltage parameter 520. If memory type parameter indicates a floating gate type memory, system 500 provides instructions to manufacturing machines, through either I/O interface 510 or network interface 512, to form HV device wells and HV LDD regions. In some embodiments, if memory type parameter indicates a charge trapping type memory, system 500 provides instructions to manufacturing machines, through either I/O interface 510 or network interface 512, to form MV device wells and MV LDD regions. In some embodiments, if memory type parameter indicates a charge trapping type memory, system 500 provides instructions to manufacturing machines, through either I/O interface 510 or network interface 512, to form I/O device wells and I/O LDD regions in both the I/O device and the core area device.

During operation, processor 502 executes a set of instructions to determine a charge pump type based on memory type parameter 516 and write/erase voltage parameter 520. For method 300, if memory type parameter 516 indicates a floating gate type memory, processor 502 alters memory array layout parameter 518 to include a HV charge pump. In some embodiments of method 300, if memory type parameter 516 indicates a charge trapping memory type, processor alters memory array layout parameter 518 to include a MV charge pump. In some embodiments of method 300, if memory type parameter 516 indicates a charge trapping memory type, processor alters memory array layout parameter 518 to omit the charge pump. For method 400, if memory type parameter indicates a floating gate type memory, system 500 provides instructions to manufacturing machines, through either I/O interface 510 or network interface 512, to form a HV charge pump. In some embodiments of method 400, if memory type parameter indicates a charge trapping type memory, system 500 provides instructions to manufacturing machines, through either I/O interface 510 or network interface 512, to form a MV charge pump. In some embodiments of method 400, if memory type parameter indicates a charge trapping type memory, system 500 provides instructions to manufacturing machines, through either I/O interface 510 or network interface 512, to omit the charge pump.

During operation, processor 502 executes a set of instructions to determine a circuit of write path based on memory array type parameter 516. Based on memory array type parameter 516, processor 502 determines a circuit of write path to provide sufficient voltage to properly operate the indicated memory type. Processor 502 stores the circuit of write path in circuit of write path parameter 522 and modifies memory array layout parameter 518 based on circuit of write path parameter 522.

One aspect of this description relates to a method of designing a charge trapping memory array. The method includes designing a memory array layout. The memory array layout includes a first type of transistors; electrical connections between memory cells of the memory array layout; a first input/output (I/O) interface; and a charge pump. The method further includes modifying the memory array layout, using a processor, to replace the first type of transistors with a second type of transistors different than the first type of transistors. The method further includes modifying the memory array layout, using the processor, to modify the charge pump based on an operating voltage of the second type of transistors.

Another aspect of this description relates to a method of forming a memory circuit. The method includes designing a memory array layout, wherein the memory array layout comprises a plurality of memory cells and predetermined electrical connections between the plurality of memory cells. The method further includes determining, using a processor, a type of memory to be produced. The method further includes selecting a charge storing material based on the determined type of memory. The method further includes maintaining the predetermined electrical connections between the plurality of memory cells.

Still another aspect of this description relates to a method of designing a memory array. The method includes designing a memory array layout. The memory array layout includes a first type of transistors; electrical connections between memory cells of the memory array layout; and a charge pump. The method further includes modifying the memory array layout, using a processor, to replace the first type of transistors with a second type of transistors different than the first type of transistors. The method further includes modifying the memory array layout, using the processor, to modify the charge pump based on an operating voltage of the second type of transistors.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of forming a memory circuit, the method comprising:
designing a memory array layout, wherein the memory array layout comprises a plurality of memory cells and predetermined electrical connections between the plurality of memory cells;
determining, using a processor, a type of memory to be produced;
selecting a charge storing material based on the determined type of memory; and
maintaining the predetermined electrical connections between the plurality of memory cells.

2. The method of claim 1, designing an input/output (I/O) device for connecting the memory array layout to external circuitry.

3. The method of claim 2, wherein designing the I/O device comprises selecting locations for I/O pins based on an operating voltage of the memory array layout.

4. The method of claim 2, wherein designing the I/O device comprises designing the I/O device having a same operating voltage as the memory array layout.

5. The method of claim 1, designing at least one core device for connecting to the memory array layout.

6. The method of claim 5, wherein designing the at least one core device comprises designing the at least one core device independent from the selected charge storing material.

7. The method of claim 1, wherein determining the type of memory to be produced comprises receiving instructions through a man-machine interface.

8. The method of claim 1, wherein determining the type of memory to be produced comprises selected the type of member from the group consisting of floating gate memory and charge trapping memory.

9. A method of designing a memory array, the method comprising:
   designing a memory array layout, the memory array layout comprising:
      a first type of transistors,
      electrical connections between memory cells of the memory array layout, and
      a charge pump;
   modifying the memory array layout, using a processor, to replace the first type of transistors with a second type of transistors different than the first type of transistors; and
   modifying the memory array layout, using the processor, to modify the charge pump based on an operating voltage of the second type of transistors.

10. The method of claim 9, wherein replacing the first type of transistors with the second type of transistors comprises replacing charge trapping transistors with floating gate transistors.

11. The method of claim 9, wherein replacing the first type of transistors with the second type of transistors comprises replacing low voltage transistors with high voltage transistors.

12. The method of claim 9, wherein the memory array comprises a first input/output interface and the method further comprises modifying the first I/O interface to form a second I/O interface having different I/O pin locations from the first I/O interface.

13. The method of claim 9, wherein replacing the first type of transistors with the second type of transistors comprises replacing a first charge storing material with a second charge storing material.

14. A method of forming a memory circuit, the method comprising:
   designing a memory array layout, wherein the memory array layout comprises a plurality of memory cells, a charge pump, and predetermined electrical connections between the plurality of memory cells;
   determining, using a processor, a type of memory to be produced;
   selecting a charge storing material based on the determined type of memory;
   modifying the charge pump based on an operating voltage of the determined type of memory; and
   maintaining the predetermined electrical connections between the plurality of memory cells.

15. The method of claim 14, wherein modifying the charge pump comprises removing the charge pump from the designed memory array layout.

16. The method of claim 14, wherein determining the type of memory comprises receiving instructions through a man-machine interface.

17. The method of claim 14, further comprising forming at least one mask based on the designed memory array layout.

18. The method of claim 17, further comprising maintaining the at least one mask regardless of the determined type of memory.

19. The method of claim 14, wherein selecting the charge storing material comprises selecting a floating gate material or a charge trapping material.

20. The method of claim 14, further comprising modifying an input/output (I/O) interface of the designed memory array layout by adjusting a location of at least one I/O pin.

* * * * *